(12) United States Patent
Annamalai et al.

(10) Patent No.: US 10,027,748 B2
(45) Date of Patent: Jul. 17, 2018

(54) DATA REPLICATION IN A TREE BASED SERVER ARCHITECTURE

(71) Applicant: Facebook, Inc., Menlo Park, CA (US)

(72) Inventors: Muthukaruppan Annamalai, Redmond, WA (US); Zelaine Fong, San Carlos, CA (US); Marc Alexander Celani, Sunnyvale, CA (US); Vishal Kathuria, Palo Alto, CA (US); Sanketh Indarapu, Santa Clara, CA (US); Rohit Subhash Bhoj, Milpitas, CA (US); Benjamin Francois Marie Renard, San Francisco, CA (US); Sumeet Ungratwar, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 273 days.

(21) Appl. No.: 14/796,810

(22) Filed: Jul. 10, 2015

(65) Prior Publication Data

US 2017/0013058 A1 Jan. 12, 2017

(51) Int. Cl.
*H04L 29/08* (2006.01)
*H04L 5/00* (2006.01)
*G06F 17/30* (2006.01)

(52) U.S. Cl.
CPC .... *H04L 67/1095* (2013.01); *G06F 17/30575* (2013.01); *H04L 5/0055* (2013.01)

(58) Field of Classification Search
CPC .... H04L 67/1095; H04L 67/42; H04L 5/0055
USPC .............. 709/203, 208, 217, 219, 232, 238; 707/609, 610, 617
See application file for complete search history.

(56) References Cited

U.S. PATENT DOCUMENTS

| 7,568,032 B2* | 7/2009 | Feng ................. G06F 9/505 709/226 |
| 2002/0065919 A1* | 5/2002 | Taylor .......... G06F 17/30575 709/226 |
| 2002/0112008 A1* | 8/2002 | Christenson ........... H04L 51/30 709/206 |
| 2007/0180309 A1* | 8/2007 | Zohar ............... G06F 11/2058 714/6.12 |
| 2008/0243867 A1* | 10/2008 | Janedittakarn .... G06F 17/30424 |

(Continued)

OTHER PUBLICATIONS

"Automatic Deployment for Hierarchical Network Enabled Server"—Caron et al, Semantics Scholar, Nov. 2003 https://pdfs.semanticscholar.org/366b/2a29bd93b0eed4c63296f33c4f6b854cb865.pdf.*

*Primary Examiner* — Randy Scott
(74) *Attorney, Agent, or Firm* — FisherBroyles, LLP

(57) ABSTRACT

The disclosure is directed to data replication in a distributed computing system. The data, e.g., received from a client, is replicated to a first set of servers ("sync replica set") synchronously and to a second set of servers asynchronously ("async tree"). A server can be a primary, secondary or a follower server. A sync replica set includes a primary server and one or more secondary servers. The async tree includes multiple follower servers deployed in a tree structure. A primary server can replicate the data to the secondary servers synchronously, and the secondary servers can replicate the data to one or more follower servers, e.g., a root node of the async tree, asynchronously. The root node then replicates the data to children of the root node, which then replicate to their children and so on until the leaf nodes of the async tree receive the data.

20 Claims, 9 Drawing Sheets

(56) References Cited

U.S. PATENT DOCUMENTS

2009/0198899 A1\* 8/2009 Revanuru ........... G06F 12/0842
   711/128
2012/0016901 A1\* 1/2012 Agarwal ........... G06F 17/30569
   707/769

\* cited by examiner

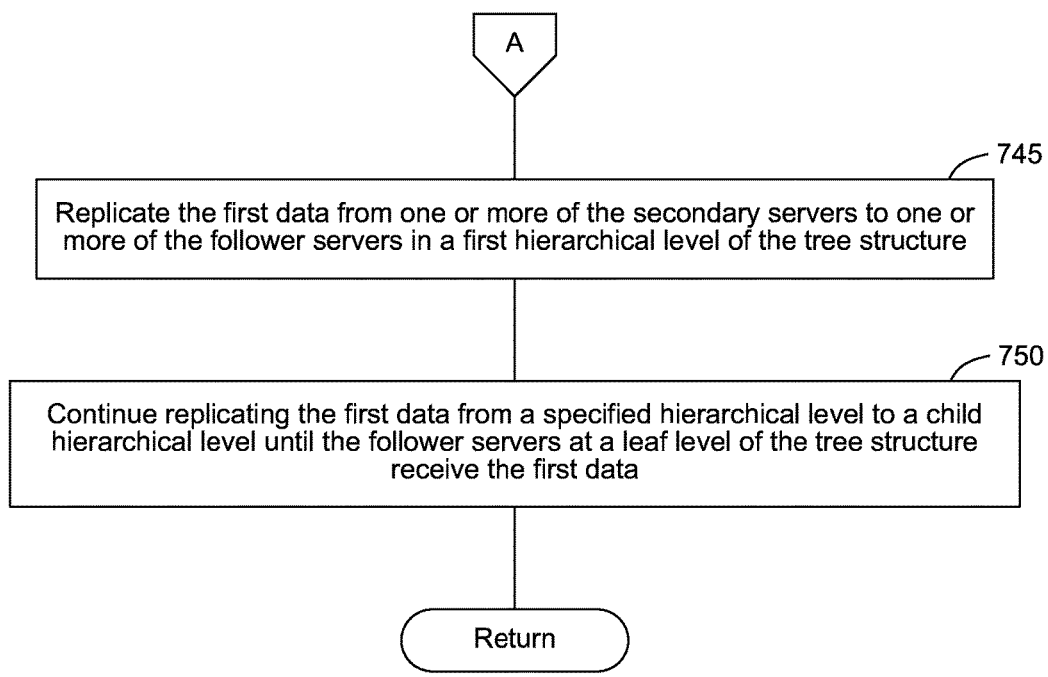
*FIG. 7 (con't)*

DATA REPLICATION IN A TREE BASED SERVER ARCHITECTURE

BACKGROUND

Current data replication methods replicate data from a read-write primary data storage server to read-only secondary data storage servers. Data storage servers are referred to herein as simply servers. The primary server and the secondary servers can be located in different geographical regions. One of the characteristics of such a replication technique can include a slow write operation if a client computer ("client") that is writing data to the primary server is located in a geographical region different from that of the primary server. Moreover, if the write operation is a synchronous write operation, the client can experience an additional delay, which is incurred in writing the data to the secondary servers. Typically, the client is unaware of why the write operations are slow, which can lead the clients to conclude that the application writing the data is faulty or slow. Increasing the number of secondary servers can increase data availability and/or reliability as a number of replicas of the data increases. However, increasing the number of servers can further increase the delay. Accordingly, the above data replication method is not scalable.

Some data replication methods, e.g., peer-to-peer file sharing networks, are scalable but the delay involved in replicating data to a particular destination can be significant. In a typical peer-to-peer file sharing network, a data file is made available to a client interested in downloading it through a number of nodes, e.g., a home computer, acting as a seed. The client can download it by connecting to the seeds and/or other peers. The peer-to-peer file sharing network typically implements a segmented file transfer protocol: the file being distributed is divided into segments. As each peer receives a new segment of the file it becomes a source (of that segment) for other peers, relieving the original seed from having to send that piece to every computer or user wishing a copy. In such file sharing systems, a segment may have to transit many nodes before the client can receive it. The number of nodes the segment has to be transit through before the client can receive it is not fixed and therefore, the time taken to receive the data segment can vary significantly, and cannot be guaranteed.

DETAILED DESCRIPTION

Figure 1:
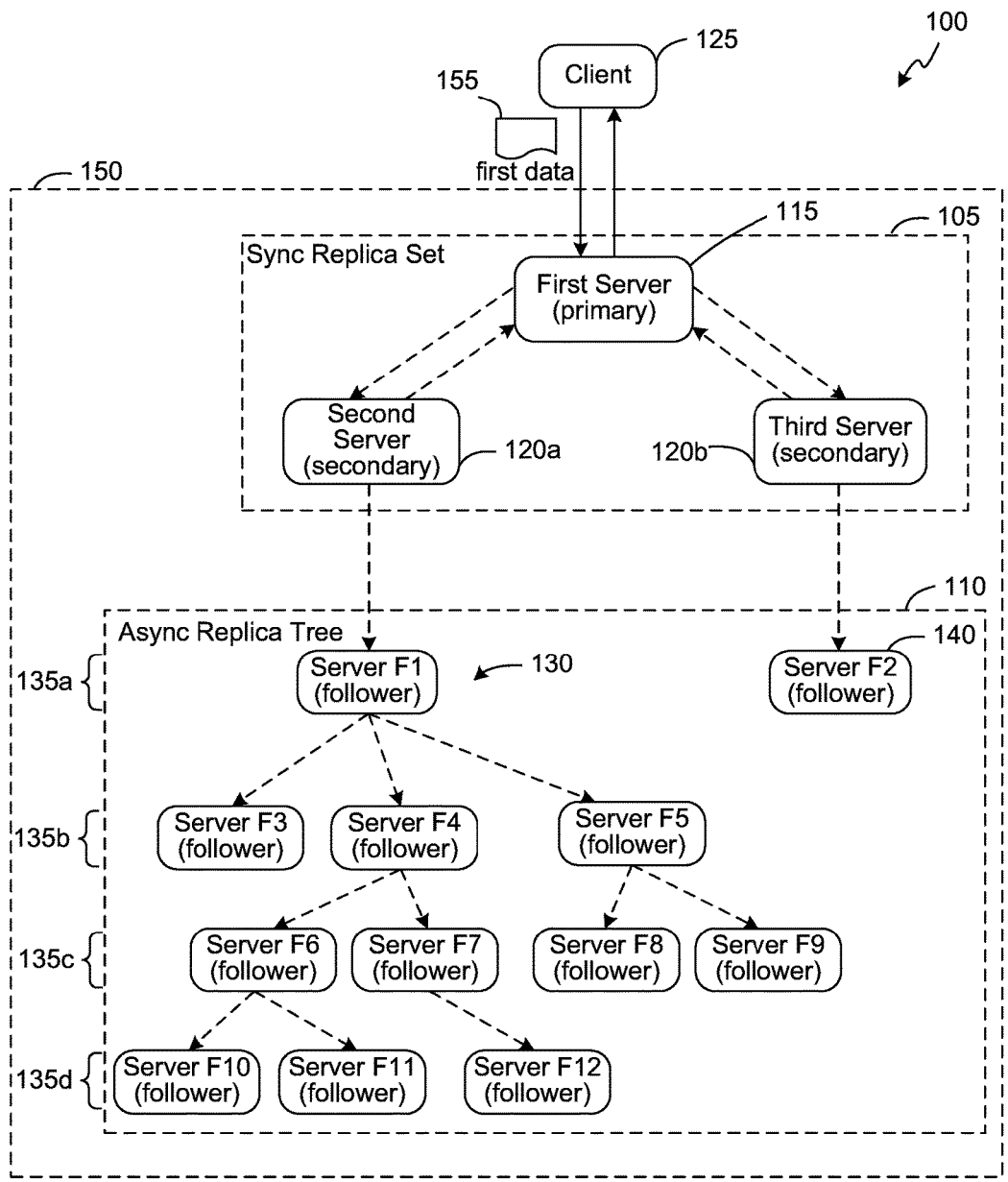
FIG. 1 a block diagram illustrating an environment in which the embodiments can be implemented in a distributed computing system.

Embodiments are disclosed for replicating data in a distributed computing system by configuring multiple data storage server computers ("servers") in the distributed computing system in a tree-based architecture. The data can be replicated to many servers. The embodiments can support both synchronous and asynchronous replication. A server in the distributed computing system can have one or more roles. For example, a server can be a primary server, a secondary server and/or a follower server. A primary server can process both read and write data requests from a client computer ("client"). A secondary server may process a read request from the client but not a write request. The secondary server receives data from the primary server, e.g., as part of data replication, and stores the received data in a data storage system associated with the secondary server. A follower server receives data from any of a primary server, a secondary server or another follower server, e.g., as part of data replication, and stores the received data in a data storage system associated with the follower server. The data can be replicated synchronously or asynchronously between the servers. In some embodiments, the data is replicated to the secondary servers synchronously and to the follower servers asynchronously.

The embodiments provide efficient data replication, e.g., achieves high data reliability and durability without significantly increasing latency for replication. The embodiments can achieve the above balance by replicating data synchronously to a first set of servers, which is also referred to as a "synchronous replica set" or "sync replica set," and asynchronously to a second set of servers, which is also referred to as an "asynchronous tree" or an "async tree," in the distributed computing system.

In some embodiments, the sync replica set includes a combination of primary and secondary servers, and the async tree includes a set of follower servers. When the client issues a write request to write data, a sync replica set for data received from the client is identified and the request is forwarded to the primary server in the sync replica set. The primary server receives the data and initiates a replication operation to replicate the data to the one or more secondary servers in the sync replica set synchronously. The primary server can also store the data in a data storage system associated with the primary server. When the primary server receives an acknowledgement from a quorum of the servers in the sync replica set indicating that the data is successfully written to the data storage systems of the associated servers, the primary server sends an acknowledgement to the client indicating a successful write of the data in the distributed computing system.

As can be the case with synchronous replication, the client resources can be held up until the client receives an acknowledgement indicating the successful write, thereby increasing a latency of the write operation ("write latency"). In some embodiments, write latency is defined as amount of time taken to complete a write operation, which can include the time elapsed between a primary server receiving a write request from a client and the client receiving an acknowledgement that the data is stored successfully at a quorum of servers.

In some embodiments, the write latency can be minimized by decreasing the quorum size. However, by decreasing the quorum size, the data reliability can also decrease. To improve the data reliability and availability, the data can be replicated to a number of servers asynchronously, e.g., follower servers in the async tree. Since the data is replicated asynchronously, the write latency is not affected, e.g., does not increase. Accordingly, after the data is written to the sync replica set, the data is replicated to a number of follower servers in the async tree. A secondary server from the sync replica set replicates the data to a follower server that is a root node of the async tree, which then can replicate to one or more child follower servers, which can further replicate to their children and so on until the follower servers at the leaf level of the async tree receive the data. Since data between these follower servers is replicated asynchronously, the write latency may not be affected.

Some or all of the servers in the sync replica set can be physically located at different locations. For example, the primary server can be in a first location, one secondary server can be in a second location and another secondary server can be in a third location. A location can be one or more of a country, a region of a country, a state, a city, a datacenter, a cluster in a datacenter, a rack in a cluster, or any other user defined location. Similarly, some or all of the follower servers can be physically located at different locations.

The follower servers can be configured as a tree structure for large scale data distribution. The replication helps in determining which of the servers can be a representative at which level, e.g., using an election process. Once the representative servers are determined, the data is replicated from a parent representative server to the child representative servers in the async tree.

The number of servers in the sync replica set is typically lesser than that in the async tree. The servers in the async tree are deployed in a tree structure in which a server in one hierarchical level of the async tree replicates data, e.g., asynchronously, to one or more servers in its child level. In some embodiments, by replicating the data synchronously to a smaller set of servers, e.g., in the sync replica set, the embodiments can provide high data availability and by replicating asynchronously to a larger set of servers that are configured as a tree structure, e.g., the async tree, the embodiments can provide high data reliability while minimizing the latency involved in data replication.

The distributed computing system can store data as shards. For example, a distributed computing system such as a social networking application can store data such as user profile data, pictures, messages, comments, etc., associated with users of the social networking application. The data can be partitioned into multiple logical partitions, each of which can be referred to as a shard. Each of the shards can contain a portion of the data, e.g., data of a subset of the users, a subset of the pictures, etc. In some embodiments, the servers can assume different roles for different shards. For example, a first server can be a primary server for a first shard, a secondary server for a second shard and a follower server for a third shard. In some embodiments, the sync replica set can be different for different shards. For example, for a first shard, the sync replica set can include a first server as a primary server and second and third servers as secondary servers, and for a second shard, the sync replica set can include the first and second servers as the secondary servers and the third server as the primary server. In another example, the sync replica set for the second shard can include a set of servers, e.g., fourth, fifth and sixth servers, that is completely different from that of the first shard.

In some embodiments, the distributed computing system includes a shard management server computer ("shard management server") that defines a sync replica set for a specified shard, e.g., identify the primary and/or secondary servers and their placements across various locations. The shard management server can define a sync replica set for a specified shard based on various factors, e.g., number of replicas required, level of data reliability and availability desired, placement of the servers across regions, a failover policy, a load balancing policy, and a maximum write latency.

The shard management server can assign different shards to different servers based on one or more of the factors described above. For example, a first server can be a primary server for a first shard and a secondary server for a second shard. After the shard management server defines the shard assignments, the shard assignments can be published to a directory service, which can be used by the client for identifying the primary server assigned to a specified shard. Further, the shard assignments and/or sync replica sets can be defined based on an application level, that is, the shard assignments can be different for different applications in the distributed computing system.

In some embodiments, the shard management server can also ensure that a quorum of the sync replica set is closer to the client, e.g., in the same datacenter or region the client is located at, in order to minimize the write latency for the client. For example, if the client is located in a region "R1", the shard management server can ensure the servers of the sync replica set forming the quorum are located in the datacenters of the same region "R1." If the client moves to another region, e.g., region "R2," the shard management server can ensure the servers of the sync replica set forming the quorum for data corresponding to the client, e.g., a sub-shard data or data within a shard corresponding to the user, are now located in the datacenters of region "R2." Accordingly, in some embodiments, the shard management server defines the shard assignments and/or sync replica sets can be defined at sub-shard level.

In some embodiments, the distributed computing system includes an async tree-deployment server computer ("async tree deployment server") that defines a deployment topology for the follower servers in the async tree. The deployment topology can define a placement of the follower servers, e.g., a number of servers to be deployed in a specified location, whether the servers have to be spread across regions, datacenters, etc. In some embodiments, the deployment of the follower servers in the async tree can be very flexible and dynamic. For example, the deployment topology can specify a number of servers to be deployed in one or more hierarchical levels of the async tree and the async tree-deployment server ensures that the specified number of servers is deployed in the specified hierarchical level. That is, the deployment topology may not have to define that a specific server computer has to be in a specific hierarchical level. In some embodiments, this can give flexibility in deploying any server in any hierarchical level and/or for any shard. Further, if more number of servers become available over time, additional servers can be deployed in any of the hierarchical levels automatically, or if a specified server fails in a specified hierarchical level, another server can be deployed in the specified hierarchical level. Accordingly, the deployment of the follower servers in the async tree can be dynamic.

In some embodiments, the deployment topology can have hierarchical levels determined based a network proximity. For example, a first hierarchical level of the async tree can include a follower server as a root node of the async tree, a set of follower servers in one or more regions can form a second hierarchical level of the async tree, which is a child of the first hierarchical level, a set of follower servers in one or more datacenters of the region can form a third hierarchical level, which is a child of the second hierarchical level, a set of follower servers in clusters of the datacenter can form a fourth hierarchical level, which is a child of the third hierarchical level, and a set of follower servers in racks of a cluster can form a fifth hierarchical level, which can be leaf nodes of the async tree. Various other deployment topologies of the async tree are possible.

In some embodiments, the async-tree deployment server conducts an election in which the follower servers participate to win a position in a specified hierarchical level. For example, when a first server participates in an election for a position of a leaf node in the async tree and wins the election, the first server can be a follower server in the leaf node. Further, upon winning the election for the position of a leaf node the first server can also participate in an election for a position in a parent hierarchical level of the leaf node. If the first server wins the election for a position in the parent hierarchical level, the first server becomes a follower server in the parent hierarchical level, then participates in the next parent hierarchical level and so on until it loses an election or becomes the root of the async tree. The first server becomes a follower server in a hierarchical level it last won the election.

The embodiments provide efficient data replication, e.g., achieves high data reliability and durability without significantly increasing latency for replication, by providing a combination of synchronous and asynchronous replication of data between various servers in the distributed computing system.

Turning now to the figures, FIG. 1 is a block diagram illustrating an environment in which the embodiments can be implemented, consistent with various embodiments. The environment 100 includes a distributed computing system 150 having multiple servers. Data, e.g., received from a client 125, is replicated to a number of servers in the distributed computing system 150. The data can be replicated synchronously to some servers and asynchronously to some other servers. For example, data can be replicated synchronously to one or more servers in a synchronous replica set ("sync replica set") 105, and asynchronously to one or more asynchronous replica trees ("async trees") 110, e.g., async tree 130.

A sync replica set can include a server that is functioning as a primary server and a configurable number of servers that are acting as secondary servers. For example, the sync replica set 105 includes a first server 115 that is functioning as a primary server and a second server 120a and a third server 120b functioning as secondary servers. In some embodiments, a sync replica set guarantees consistency among a specified number of replicas for data, e.g., even in the case of failure of any of the servers in the sync replica set. In the environment 100, the sync replica set 105 is an example of a "3-way" replication, in which the distributed computing system 150 can guarantee three replicas of the data. Typically, in a "3-way" replication, a sync replica set includes one primary server and two secondary servers. The number of servers in a sync replica set is configurable and can depend on various factors, e.g., fault tolerance, load balancing, write latency and other required performance characteristics. In some embodiments, more the number of servers in the sync replica set 105, the higher the time taken to service a write request from the client 125 as data is replicated to the servers synchronously.

The servers in the sync replica set 105 can be physically located at same or difference locations. For example, the servers in the sync replica set 105 can reside in the same rack of a cluster of a datacenter, the same cluster, the same data center, the same region, or even cross regions. The placement of the servers can depend on various factors, e.g., fault tolerance and other performance requirements.

An async tree includes one or more follower servers configured in a tree structure in which data is replicated from a root of the tree structure to a leaf node of the tree structure. For example, the async tree 130 includes a number of follower servers configured as a four-level tree with "Server F1" as a root node of the async tree 130. The four levels include a first level 135a, a second level 135b, a third level 135c and a fourth level 135d in which the fourth level 135d is a leaf node level of the async tree 130. A follower server can receive data directly from a primary server, a secondary server or from other follower servers. For example, in the async tree 130, the follower server "Server F1" receives the data from the second server 120a, which is a secondary server in the sync replica set 105, the follower server "Server F3" receives the data from the follower server "Server F1", and so on. Starting from the root node, each level replicates the data to its lower level until the leaf nodes receive the data. For example, in the async tree 130, the follower server "Server F1," after receiving the data from the second server 120a, asynchronously replicates the data to one or more follower servers in the second level 135b, then one or more of the follower servers in the second level 135b asynchronously replicate the data to one or more follower servers in the third level 135c, and one or more of the follower servers in the third level 135c asynchronously replicate the data to one or more follower servers in the fourth level 135d, which are the leaf nodes of the async tree 130. In some embodiments, this chaining of the follower servers ensures that in the presence of a large number of follower servers, no single follower server is overwhelmed and/or loaded.

In some embodiments, the follower servers serve two purposes. Firstly, they can allow for a setup where data is asynchronously backed up. Consider a setup where the distributed computing system has a replica set within a first region with a follower server in a different region. When disaster strikes in the first region, the follower server can be used to recover the data from. Secondly, follower servers can allow for the formation of efficient data distribution networks. An example of this could be a setup where a number of servers (e.g., hundreds or even thousands) would want to consume the data that comes out of the replica set, e.g., search index update. In effect, this can form a producer-consumer pattern with the replica set forming the producer while the follower servers being the consumers. Followers can be attached to another follower recursively to form an arbitrary tree hierarchy for large-scale data replication.

Referring back to the environment 100, when the client 125 issues a write request for writing data to the distributed computing system 150, a primary server in the sync replica set 105, e.g., the first server 115, receives the write request. The primary server 115 replicates the data to the secondary servers 120 synchronously. For example, the primary server 115 can send a message to the secondary servers 120, e.g., in parallel, asking them to store the data at their associated data storage systems. After the primary server 115 gets a confirmation from a quorum of servers, which can include the primary server itself, that the data is successfully written to their associated data storage systems, the primary server 115 sends a response to the client 125 to acknowledge a successful write. Note that the confirmation is needed from a quorum of servers in order to agree on a write, as opposed to from all the servers in a sync replica set. In some embodiments, this tolerance of the failure of a minority of servers in the sync replica set is a source of high availability in the distributed computing system 150.

After the data is stored in the sync replica set 105, the data can be replicated to the follower servers in a set of async trees 110 asynchronously. A primary or secondary server from the sync replica set can send the data to the set of async trees 110. For example, the secondary server 120*a* can replicate the data asynchronously to the follower server "Server F1" in the async tree 130 and the secondary server 120*b* can replicate the data asynchronously to the follower server "Server F2" in the async tree 140. In the async tree 130, the data can then be propagated from the first hierarchical level 135*a* to the leaf the nodes in the fourth hierarchical level 135*d*.

The data that is replicated in the distributed computing system can be a stream of updates to existing data, e.g., updates to a news feed of a user in a social networking application, or can be large binary large objects (blobs) of new data. In some embodiments, the stream of updates replicated to the follower servers in the set of async trees 110 can be an ordered stream of updates and the follower servers receive the updates in the same order as in the stream of the updates. That is, a follower server can commit writes in the exact same order as a primary/secondary does, and maintain the exact same data and replication log as a primary/secondary does, except that the follower server's data get updated with a slight delay compared to that of the primary/secondary.

The distributed computing system 150 can host one or more applications executing on one or more application servers (not illustrated). Different applications can have different replication policies. A replication policy can define and/or include various factors for replicating data in the distributed computing system 150, e.g., a number of servers in the sync replica set, a physical placement of the servers of the sync replica set at various locations, a number of follower servers, and a deployment topology of the follower servers in the async trees. An application can define its replication policy based on the application's performance requirements, e.g., data reliability, data availability, fault tolerance, scalability, load balancing. For example, an application which needs very low latency in replicating data can have fewer servers in the sync replica set, e.g., have a small quorum size in the sync replica set and/or physically place the servers in the same region, datacenter, etc. In another example, if an application requires high availability and can withstand a specified latency, it can have a large number of servers in the sync replica set. In yet another example, if a three way, cross-region synchronous replication setup cannot meet the performance goals of an application, the replication policy can be changed to a three way synchronous replication in a single region, with one or more follower servers in a different region to provide disaster recovery, or the replication policy cab even be change to a basic one primary server–>one follower replication without any secondary server.

Similarly, the async tree can also be deployed using various deployment topologies that are determined based on an application's requirements. Some applications can have consumers that are spread across several locations and therefore, can have follower servers spread across those locations. An application can have more or fewer follower servers based on their requirements of load balancing. An application can define an async tree with fewer or more hierarchical levels depending on an accepted latency in the leaf nodes receiving the data. In some embodiments, higher the number of levels, the more the time taken for the leaf nodes to receive the data. An application can define a deployment topology taking network proximity of the follower servers in the distributed computing system 150 into consideration. In some embodiments, the servers in the sync replica set 105 and the set of async trees 110 can have similar hardware and/or software capabilities. However, the servers can assume different roles, e.g., primary, secondary or follower, for different shards of data.

Figure 2:
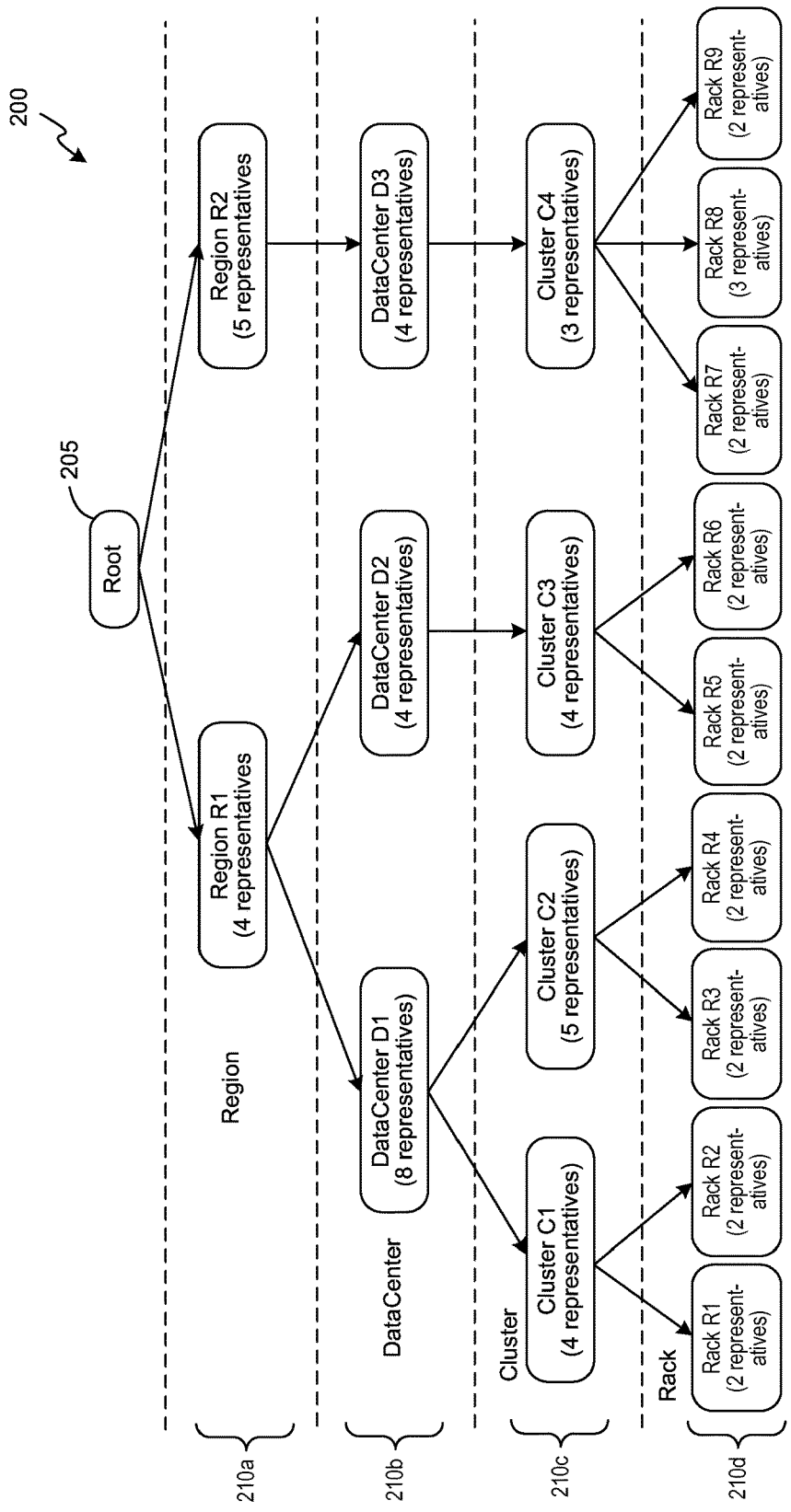
FIG. 2 is a block diagram of an async tree whose deployment topology is based on network proximity in the distributed computing system of FIG. 1, consistent with various embodiments.

FIG. 2 is a block diagram of an async tree 200 whose deployment topology is based on network proximity in a distributed computing system of FIG. 1, consistent with various embodiments. In some embodiments, the async tree 200 can be similar to the async tree 130. The deployment topology of the async tree 200 can configure the follower servers to be deployed as a tree structure spanning various levels of a communication network of the distributed computing system 150, e.g., regions, datacenters, clusters, and racks. In some embodiments, a communication network of the distributed computing system 150 has regions, at least some of the regions have datacenters, at least some of the datacenters can have clusters and at least some of the clusters can have racks.

The async tree 200 includes a follower server as a root 205 of the async tree 200, which forms the first level of the async tree 200, some follower servers in a region, e.g., region "R1", which forms a second level 210*a*, some follower servers in datacenters of the region, e.g., datacenters "D1" and "D2" in the region "R1", which form a third level 210*b*, some follower servers in clusters of a datacenter, e.g., clusters "C1," "C2" and "C3" of the datacenters "D1" and "D2", which form a fourth level 210*c*, and finally some follower servers in racks of a cluster, e.g., racks "R1"-"R6" of clusters "C1," "C2" and "C3", which form a fifth level 210*d*.

The async tree 200 can receive data from one or more servers in a sync replica set, e.g., sync replica set 105 of FIG. 1. For example, the secondary server 120*a* can asynchronously replicate the data to the root 205 of the async tree 200. The async tree 200 then propagates the data, starting from the root 205, level by level until the leaf nodes of the async tree 200 receive the data. For example, the root 205 asynchronously replicates the data to the follower servers in the region level 210*a*, which then asynchronously replicate to the follower servers in the datacenter level 210*b*, which then asynchronously replicate to the follower servers in the cluster level 210*c*, which then asynchronously replicate to the follower servers in the racks level 210*d*. In some embodiments, consumers of the data consume the data from the follower servers in the racks of the async tree 200.

A level of an async tree can have one or more follower servers. For example, in the async tree 200, the region "R1" has four follower servers, the datacenter "D1" has eight follower servers. A follower server in a specified level can replicate the data to one or more follower servers in a level below the specified level. For example, a region "R1" can replicate the data to one or more of the eight servers in datacenter "D1." In some embodiments, if the region "R1" replicates the data to only a specified follower server of the eight servers, the specified follower server can replicate the data to the remaining of the eight servers. In some embodiments, copying the data between servers within a specified level can consume less network resources than copying across levels.

The above deployment topology of an async tree 200 is just one example. The follower servers may be deployed as an async tree based on various other deployment topologies. The deployment topology can be very flexible. For example, the deployment topology may not have to define a specific follower server's location, e.g., level, in the async tree 200, instead it can specify a minimum, a maximum, and/or a specified number of follower servers to be deployed in a specified level of the async tree 200. The distributed computing system 150, e.g., an async tree-deployment server described at least with reference to FIG. 4, can ensure that the follower servers are deployed in the async tree 200 as per the deployment topology. The deployment topology can configure the follower servers to be deployed in some or all of the levels of an async tree. In some embodiments, the async tree 200 may not have follower servers in one or more levels of the async tree 200.

Further, the deployment topology can be very dynamic. The async tree 200 can deploy follower servers as and when they become available or remove them when they fail or for some other reason. Since the deployment topology does not tie any specific follower server to any specific level, the follower servers can be easily added and/or removed to and/or from any of the levels.

In some embodiments, the follower servers are deployed into the async tree 200 based on an election process. The follower servers compete with each other for a particular position in the async tree 200. Starting from the lowest level in the async tree 200, a follower server attempts to make itself a representative for a rack it resides in. In some embodiments, a representative follower server is the server responsible to receive data from the parent representative and replicate it to a child representative. If the rack already has a sufficient number of representatives, the server fails to promote itself to be a rack-level representative, and can simply attach to an existing rack-level representative as a leaf node in the tree. On the other hand, if the server successfully promotes itself as a rack representative, it further attempts to promote itself as a representative for the cluster the rack resides in. If it successfully becomes a cluster representative, it releases its role as a rack representative. In other words, a server only resides at one level of the tree. This process continues so long as the server can successfully promote itself to a higher level.

For example, when a first follower server wins in an election for a position of a leaf node, e.g., in rack "R1", in the async tree 200, the first follower server can become a representative in the fifth level 210d. Further, upon winning the election for the position of the fifth level 210d, the first follower server can participate in an election for a position in the fourth level 210c. If the first follower server wins the election for a position in the fourth level 210c, the first follower server can relinquish its position in the fifth level 210d and become a representative in the fourth level 210c. Accordingly, the first follower server can continue to promote itself to the next parent hierarchical level until it loses an election or becomes a root 205 of the async tree 200. The first follower server is deployed in a hierarchical level it last won the election. If a number of representatives in a particular level has reached a specified number then other follower servers may not able to compete for that particular level. In some embodiments, the election is conducted by the async-tree deployment server, which is described at least with reference to FIG. 4 below.

The async tree 200 can be self-forming and/or self-healing. For example, when the deployment topology is input to the async-tree deployment server, the async-tree deployment server ensures that the servers are placed appropriately in the async tree. In some embodiments, when a follower server boots up, it queries the async-tree deployment server to retrieve the deployment topology and starts participating in the election. Accordingly, as and when new follower servers come up, they deploy themselves into the async tree 200. When a follower server leaves the async tree 200, e.g., a follower server fails, the async-tree deployment server can detect this through lost heartbeats of the follower server and notifies one of the failed server's child nodes in the async tree 200 to promote itself to the higher level to replace the failed follower server, which helps repair the structure of the async tree 200. When a new follower server comes up, it can participate in the election and deploy itself into one of the available positions to compensate for the loss of the failed server.

Figure 3:
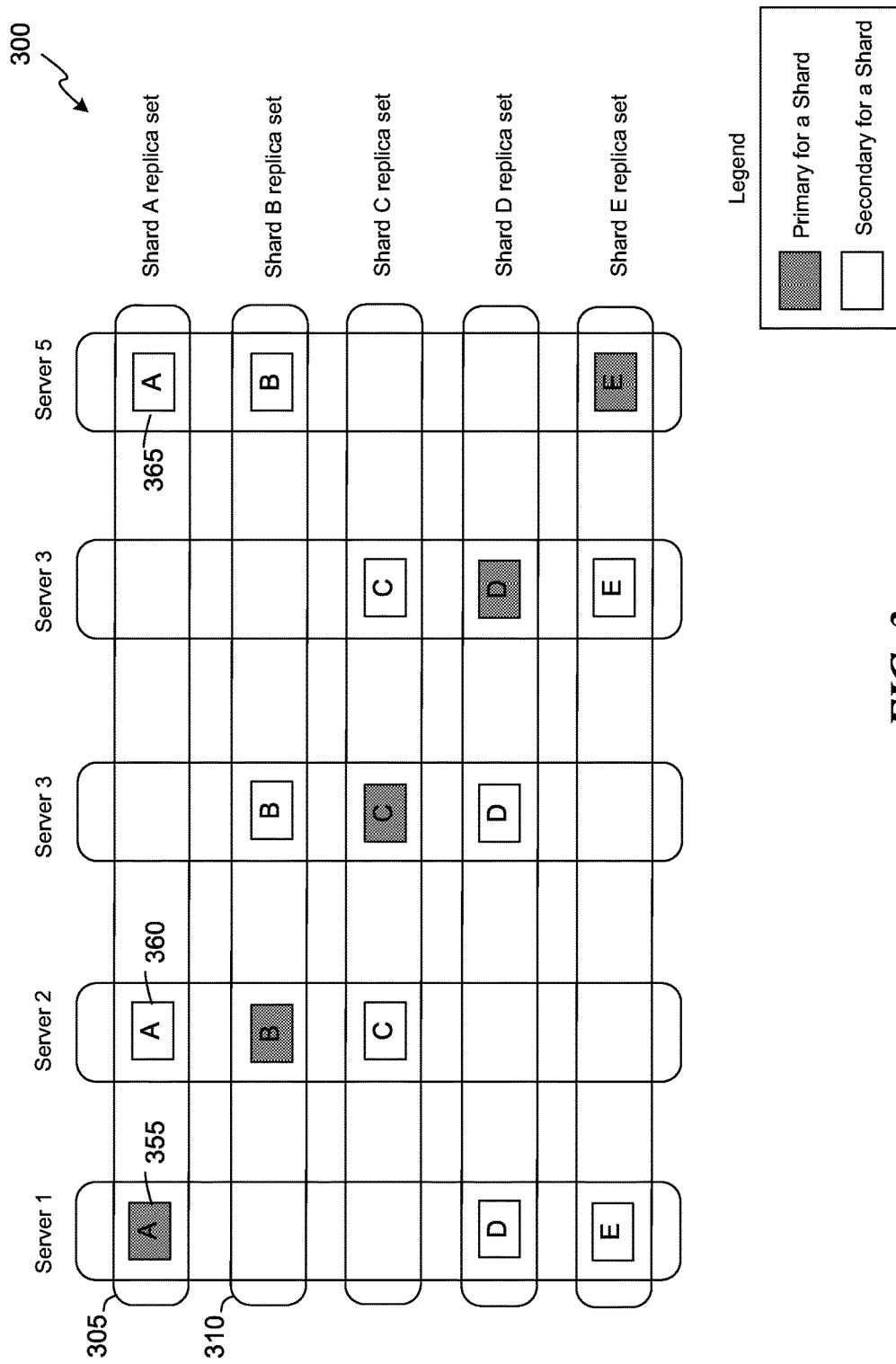
FIG. 3 is a block diagram of an example illustrating placement of shards in the distributed computing system of FIG. 1, consistent with various embodiments.

FIG. 3 is a block diagram of an example 300 illustrating placement of shards in a distributed computing system of FIG. 1, consistent with various embodiments. The servers in the example 300 can be similar to the servers in the environment 100 of FIG. 1. For example, "server 1" can be similar to the primary server 115, "server 2" can be similar to the secondary server 120a and "server 5" can be similar to secondary server 120b.

As described above, data in the distributed computing system 150 can be managed as shards, which are logical partitions of data. In some embodiments, the shards store disjoint subsets of the data in the distributed computing system 150. For example, a social networking application implemented in the distributed computing system 150 can generate data such as user profile data, pictures, messages, comments, etc., associated with users of the social networking application. The data can be partitioned into multiple shards. Each of the shards can contain a portion of the data, e.g., data of a subset of the users, a subset of the pictures, etc. In some embodiments, a server can host more than one shard. In the example 300, a server hosts three shards.

In some embodiments, different shards are assigned to different servers. As illustrated in the example 300, shard "A" is assigned to "server 1," shard "B" is assigned to "server 2," shard "C" is assigned to "server 3" and so on. In some embodiments, a shard management server (which is described in detail at least with reference to FIG. 4 below) in the distributed computing system 150 decides the shard placements among the servers.

Figure 4:
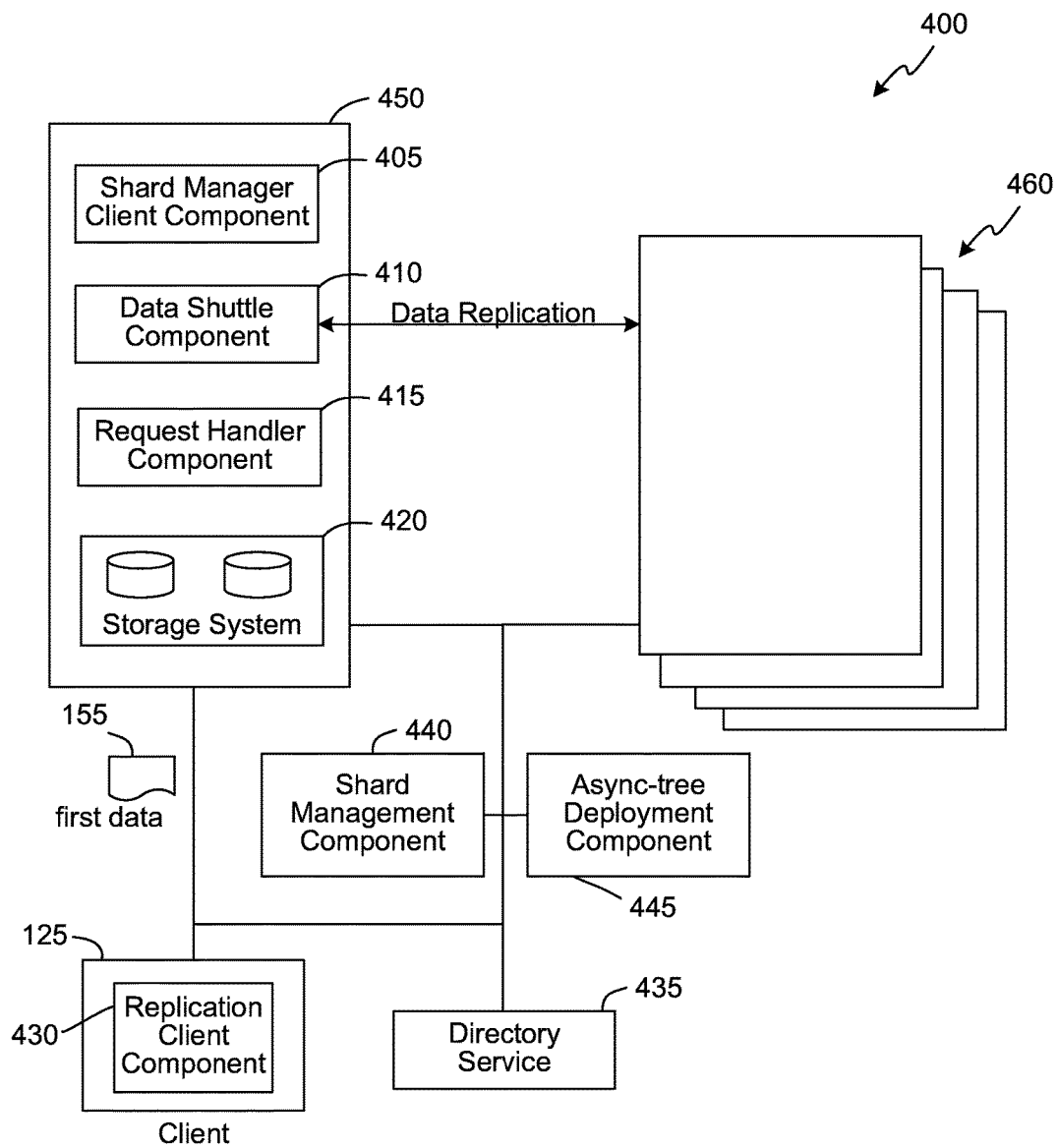
FIG. 4 is a block diagram of a system for implementing the embodiments in the distributed computing system of FIG. 1, consistent with various embodiments.

Further, in some embodiments, the servers can assume different roles for different shards. The shard management server can assign the roles for the servers. As illustrated in the example 300, "server 1" can be a primary server for a shard "A" and a secondary server for shards "D" and "E." What this can mean is that a sync replica set can be different for different shards. For example, in a first sync replica set 305 for a shard "A," "server 1" is a primary server and the servers "server 2" and "server 5" are secondary servers, and in a second sync replica set 310 for shard "B" "server 2" is a primary server and the servers "server 3" and "server 5" are secondary servers. In FIG. 4, a shaded block in a server, e.g., shard "A" 355, indicates that a server which hosts a shard represented by the shaded block is a primary server for that shard. Similarly, an unshaded block in a server, e.g., shard "A" 360 and shard "A" 365, indicates that a server which hosts a shard represented by the block is a secondary server for that shard.

Similarly, the follower servers can be different for different shards. For example, a first set of servers can be follower servers for a shard "A" and a second set of servers, which is different from the first set, can be designated as the follower servers for shard "B." Also, a server can assume all roles but for different shards. For example, while "server 1" is a primary server for shard "A" and secondary server for shards "D" and "E," it can be a follower server for shards "G" and "H" (not illustrated). In some embodiments, a server can also be just a follower server for all the shards it hosts and not be a primary or a secondary for any of the shards. The shard management server can make these assignment decisions based on various factors, e.g., a number of shards a server can host, a placement policy (number of replicas, placement across region/datacenter/cluster/rack, etc.), a failover policy, a load balancing policy, and other performance requirements. The shard assignments can be published, e.g., for use by the client 125. In some embodiments, the shard assignments of the primary and secondary servers are published but not that of the follower servers. That is, for a given shard, the client 125 can retrieve information regarding the primary and secondary servers but not that of the follower servers.

FIG. 4 is a block diagram of a system 400 for implementing the embodiments of FIG. 1, consistent with various embodiments. In some embodiments, the system 400 can be implemented in the environment 100 of FIG. 1. The system 400 includes a number of servers, e.g., a first server 450 and a set of servers 460. Each of those servers can be a primary server, a secondary server and/or a follower server. As described above at least with reference to FIG. 3, the above servers can assume different roles for different shards. In some embodiments, the first server 450 can be similar to the primary server 115 of FIG. 1 and the set of servers 460 can include one or more secondary servers similar to the secondary server 120a and 120b and one or more follower servers similar to any of the follower servers in the set of async trees 110.

The system 400 includes a shard management server 440 that performs various shard related tasks, including assigning shards to servers, defining a sync replica set for a shard, and optionally facilitate assigning follower servers to the shard. The shard management server 440 can assign shards to servers based on various factors, e.g., a number of shards a server can host, a placement policy (number of replicas, placement across region/datacenter/cluster/rack, etc.), a failover policy, a load balancing policy, and other performance requirements of an application, all of which can be defined in a replication policy of the application. The shard management server 440 can consume the replication policy and place/assign different shards across the servers as per the requirements. As new databases are created and/or deleted and the shard associated with a database changes, the replication policy can be updated. The shard management server 440 can provide an efficient failover mechanism, e.g., by re-assigning roles and moving replicas around in the face of failures of one or more servers in the system 400.

The shard management server 440 can make the assignments for a sync replica set and optionally for an async tree too. The shard management server 440 publishes the shard assignments, e.g., to a directory service 435. A client, e.g., client 125, can query the directory service 435 to obtain the shard assignments, e.g., a primary server and/or secondary servers assigned for a specified shard. In some embodiments, a write request from the client 125 is only serviced by a primary server and a read request can be serviced by either the primary server or one of the secondary servers. For example, a write request from the client 125 for writing a first data 155 is processed by a primary server, e.g., the first server 450, assigned to a shard to which the first data 155 belongs. The secondary servers do not process any write requests from the client 125. However, they can process read requests from the client 125.

While the clients can directly communicate with the servers, there is a reasonable amount of work involved, e.g., in finding the right server that is the primary for a given shard and passing in right headers such as a version header to ensure read-after-write consistency. In some embodiments, the client includes a replication client component 430, which performs various tasks, e.g., find the primary server for a given shard. The replication client component 430 also maintains the versions returned from the primary server on write requests, e.g., for a particular data object, and passes the latest version of the data object it last received along with read requests in order to ensure read-after write consistency, e.g., the data object retrieved is the latest and not of a version before the last write.

While the shard management server 440 publishes the primary and secondary server assignments for a shard to the directory service 435, the shard management server 440 may not publish the assignments of the follower servers, e.g., because the client 125 may not read from and/or write to the follower server directly. A follower server receives the data, e.g., first data 155, from the primary server and/or the secondary servers when the primary server and/or the secondary servers replicate the data to the follower server.

A server, e.g., the first server 450, can replicate the data to other servers, e.g., a secondary server in the set of servers 460, using a data shuttle component 410. Before the first server 450 can start queuing replication operations, the data shuttle component 410 may need to know the configuration information surrounding all relevant shards. The data shuttle component 410 can use this configuration information to build the replication network. The configuration information that the data shuttle component 410 may require can include the list of shards the first server 450 is responsible for, the role that the first server 450 plays for each of those shards, the other servers that host each of those shards, and the roles that each of those servers play for those shards. The configuration information can continue to change at runtime as shards can be moved around and roles are changed, e.g., because of failover or load balancing. The data shuttle component 410 can automatically make any such transitions. In some embodiments, the data shuttle component 410 can derive the configuration information from the shard management server 440.

The data shuttle component 410 allows for the replication of opaque blobs and/or stream of updates and does not make any assumptions about the replicated payload. The data is stored at a storage system associated with a server. For example, the first server 450 stores the first data 155 in the storage system 420. In some embodiments, the storage system 420 is a database that can store key-value pairs. The data that is stored or replicated to a server can be a serialized form of the data. A request handler component 415 can convert write requests to this serialized form before the data is passed to the data shuttle component 410 for generating quorum and ensuring the necessary replication factor. The write request can be rejected by the data shuttle component 410 if the first server 450 is not a primary server for the shard with which the first data 155 is associated.

In some embodiments, the first server 450 acknowledges the write request from the client 125 at two different points, once when it has been successfully acknowledged by the quorum in the sync replica set (e.g., formed using one or more secondary servers from the set of servers 460) and once when the update is applied to the local storage, e.g., the storage system 420 of the first server 450. Depending on the configuration, the request handler component 415 can acknowledge the client 125 at either point. In some embodiments, waiting for the update to be committed to the storage system 420 before returning to the client 125 would mean higher client response latencies. In some embodiments, acknowledging the client 125 immediately after the update was successfully acknowledged by the quorum but before it has been persisted to the local storage would mean faster response latencies but it can also mean that an immediate read of the same data might return a stale response since the update might not have been committed by the time the read arrives (e.g., no read-after-write consistency). In order to deal with this, the request handler component 415 gets from the data shuttle component 410 a monotonically increasing version number that is associated with the write, which it then passes back to the client 125 in the form of a response header. If read-after-write consistency is required, the client 125 can pass this version number in as a request header when performing reads, in order to ensure that any returned data is not stale with respect to this version.

In some embodiments, all read requests to the first server 450 bypasses the data shuttle component 410 since the read requests do not involve any data set mutations. These read requests can be served directly from the local storage, e.g., storage system 420. Note that reads can be served from secondary servers as well, however in order to ensure that returned data is not stale, clients may need to specify the previously mentioned version when performing the read.

The storage system of the servers, e.g., storage system 420, deserializes the payload associated with write operations before storing them. The storage system 420 has a version key stored as part of the data, which tracks the data shuttle component-defined version up to which updates have been persisted within it. Every time an update is committed to the storage system 420, the version key is updated atomically. Upon a process restart, the data shuttle component 410 can query this version and resume persisting updates from where it left off.

Referring back to the first server 450 or the set of servers 460, a server includes a shard manager client component 405 that works with the shard management server 440 to implement the shard assignments determined by the shard management server 440. The shard manager client component 405 upon startup of the first server 450, apart from establishing a heartbeat to announce its liveness, can let the shard management server 440 know which service and a specific deployment the first server 450 is associated with. The shard management server 440 conveys any shard placement decisions to the shard manager client component 405.

A new shard can be added to a server when it is a new shard, the shard is being failed over from another server, or the shard is being load balanced into the local server. The addition of a new shard in a specific role can cause the shard manager client component 405 to feed in the new configuration information to the data shuttle component 410.

An existing shard on a server is dropped when the shard is deleted or the shard is being load balanced out of the server. The drop of a shard can cause the shard manager client component 405 to notify the data shuttle component 410 of the change.

It is also possible that the role for a specific shard that the local server, e.g., first server 450, plays has changed (primary<->secondary transitions). This can happen when a primary server has failed and a new server is elected as the primary server, or a load on a server exceeds a specified threshold and the primary role is being load balanced out of the server. The shard manager client component 405 can feed in the relevant configuration change into the data shuttle component 410 in order for the data shuttle component 410 to update the state of the first server 450 appropriately.

In some embodiments, to help the shard management server 440 to make optimal decisions surrounding an election of the primary server, the data shuttle components of the servers, e.g., the data shuttle component 410, can publish a fingerprint of the state associated with every shard. The shard management server 440 can use this information to select the best possible candidate from the replica set. The shard management server 440 can load balance shard roles across servers, and also load balance shards themselves across servers. The ability to load balance shards themselves across servers can help in scaling of the servers in a particular tier since adding servers to a hot tier can automatically trigger existing shards in the system 400 to be evenly placed across the servers.

In some embodiments, each of the servers in the distributed computing system 150 includes the components 405-420.

The system 400 also includes an async-tree deployment server 445 that facilitates deploying follower servers for a shard. For example, the async-tree deployment server 445 can facilitate deploying the follower servers for a shard with which the first data 155 is associated. In some embodiments, the async-tree deployment server 445 deploys the follower servers in a tree structure, e.g., as the async tree 130. The async-tree deployment server 445 deploys the follower servers based on the deployment topology, which can be defined as part of the replication policy. In some embodiments, the async-tree deployment server 445 facilitates the election process, e.g., described at least with reference to FIG. 2 above, for deploying the follower servers. In some embodiments, the async-tree deployment server 445 can request the shard management server 440 to assign a specified server as a follower server for a shard. After the shard management server 440 assigns the specified server as a follower server to a specified shard, the async-tree deployment server 445 can deploy the follower server in async tree 130, e.g., by facilitating the follower server to participate in an election process for a position in the async tree 130.

Figure 5:
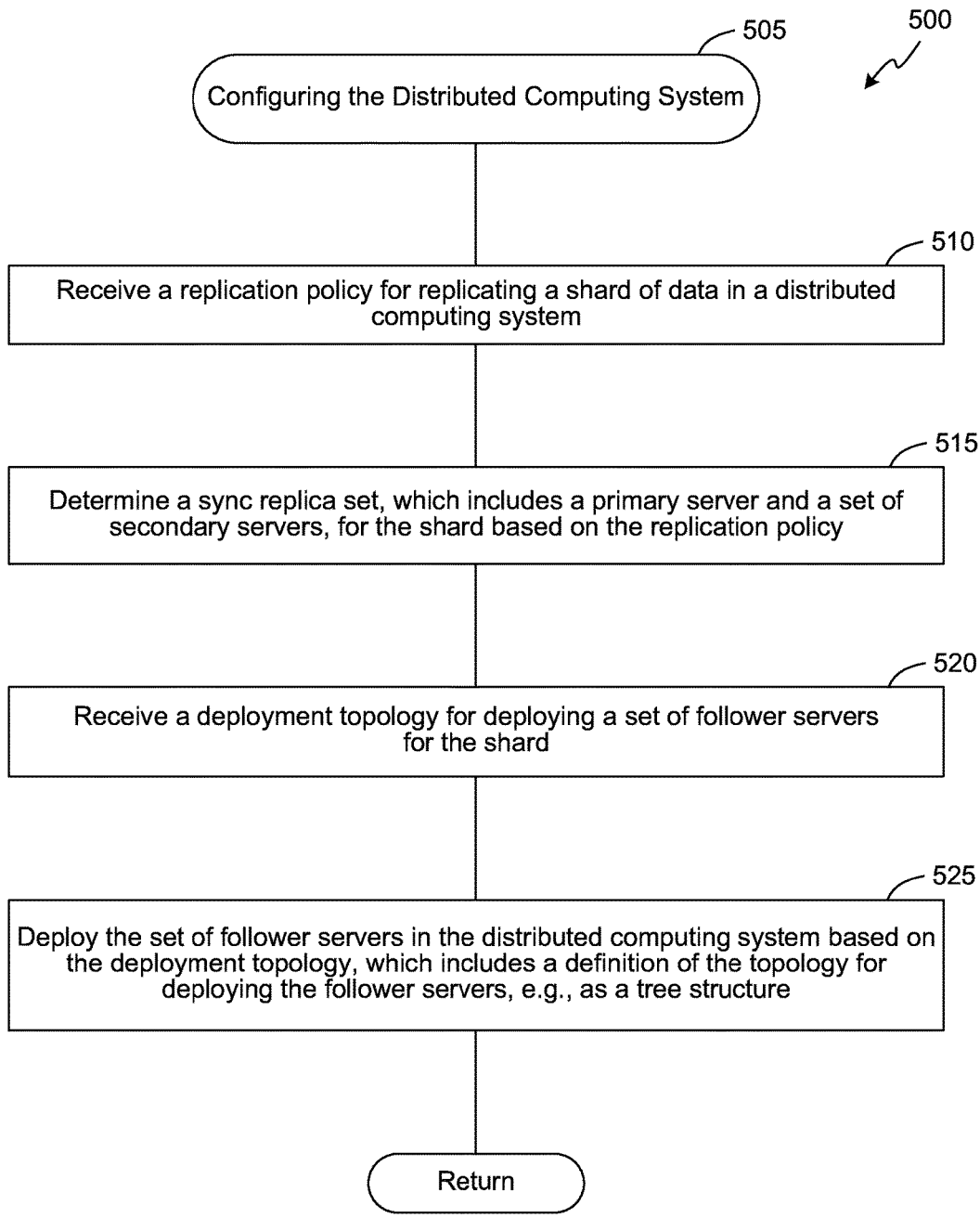
FIG. 5 is a flow diagram of a process of configuring the distributing computing system of FIG. 1 for replicating data, consistent with various embodiments.

FIG. 5 is a flow diagram of a process 500 of configuring a distributing computing system of FIG. 1 for replicating data, consistent with various embodiments. The process 500 may be executed in the environment 100 of FIG. 1 and using the system 400 of FIG. 4. The process 500 begins at block 505, and at block 510, the shard management server 440 receives a replication policy for replicating a shard of data in the distributed computing system 150. In some embodiments, the replication policy can define and/or include various factors for replicating data in the distributed computing system 150, e.g., a number of servers in a sync replica set, a physical placement of the servers of the sync replica set at various locations, a number of follower servers, and a deployment topology of the follower servers, e.g., as async trees. An application can define its replication policy based on the application's performance requirements, e.g., data reliability, data availability, fault tolerance, scalability, load balancing.

At block 515, the shard management server 440 determines a sync replica set, which can include a server that is designated as a primary server for the shard and a set of servers designated as the secondary servers for the shard based on the replication policy.

At block 520, the shard management server 440 receives a deployment topology for deploying a set of follower servers for the shard. In some embodiments, the deployment topology can define a topology in which the follower servers have to be deployed. For example, the deployment topology can define that the follower servers have to be deployed as a tree structure, e.g., async tree 130 or 200, and can include information like number of hierarchical levels in the tree, a number of servers to be deployed in one or more hierarchical levels of the tree, locations at which the follower servers are to be deployed, etc. In some embodiments, the deployment topology can be similar to the deployment topology described at least with reference to FIG. 2.

At block 525, the async-tree deployment server 445 deploys the set of follower servers in the distributed computing system 150 based on the deployment topology, and the process 500 returns. For example, the async-tree deployment server 445 deploys the follower servers as the async tree 130. In some embodiments, deploying the follower servers can include enabling a follower server to participate in an election process, e.g., described at least with reference to FIG. 2 above, to be deployed in a particular position in the tree structure.

Figure 6:
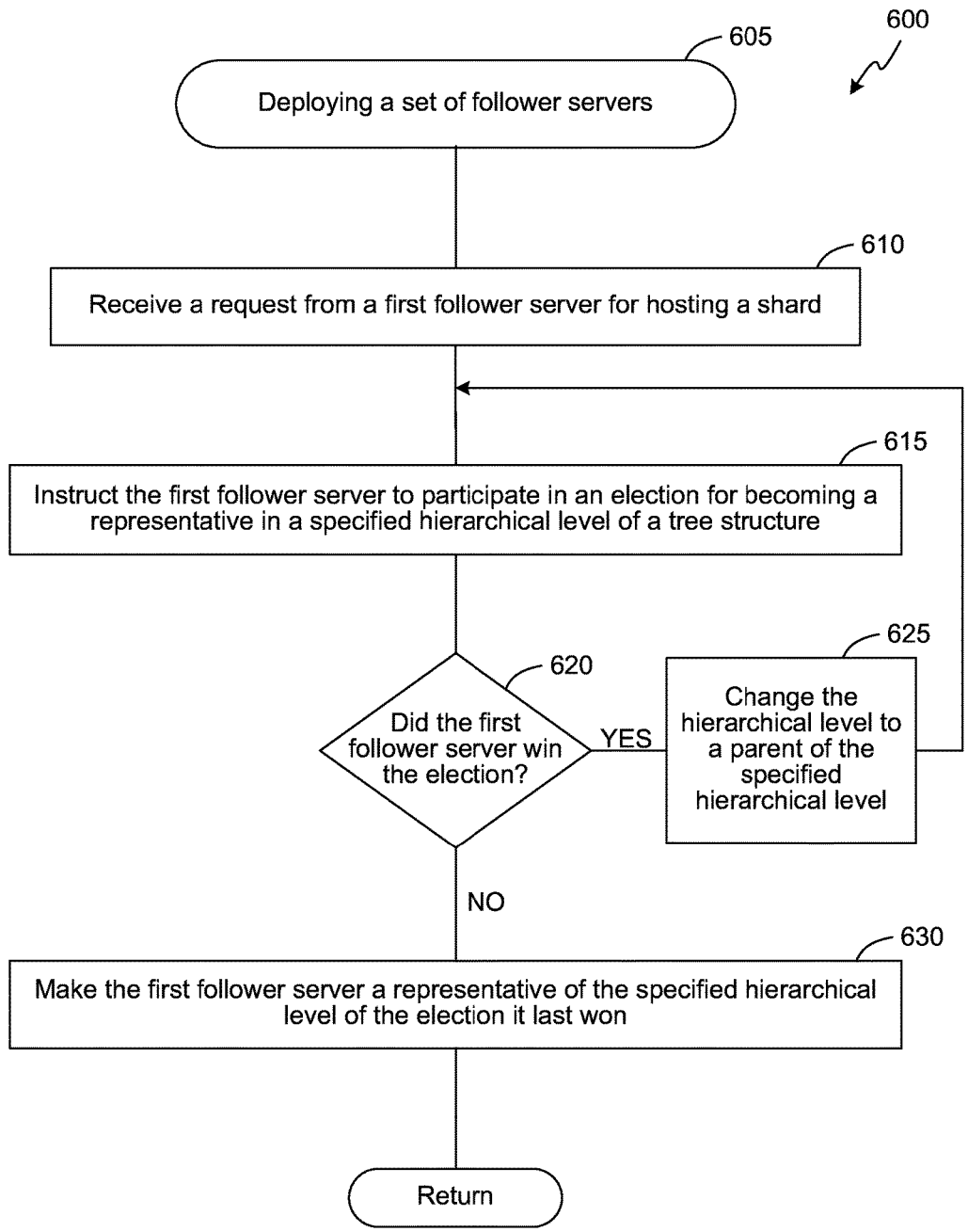
FIG. 6 is a flow diagram of a process of deploying a set of follower servers in the distributing computing system of FIG. 1, consistent with various embodiments.

FIG. 6 is a flow diagram of a process 600 of deploying a set of follower servers in the distributing computing system of FIG. 1, consistent with various embodiments. The process 600 may be executed in the environment 100 of FIG. 1 and using the system 400 of FIG. 4. The process 600 begins at block 605, and at block 610, the async-tree deployment server 445 receives a request from a follower server to be deployed in the distributed computing system 150. In some embodiments, the process 600 can be executed as part of block 525 of the process 500. In some embodiments, the follower server is to be deployed in a tree structure, e.g., the async tree 200.

At block 615, the async-tree deployment server 445 instructs the follower server to participate in an election process for becoming a representative in a specified hierarchical in the async tree 200, e.g., a lowest hierarchical level of the async tree 200.

At determination block 620, the async-tree deployment server 445 determines if the follower server won the election. If the follower server won the election for the specified hierarchical level, at block 625, the async-tree deployment server 445 promotes the follower server to a parent hierarchical level of the specified hierarchical level and instructs the follower server to participate in an election for winning a position in the parent hierarchical level. This process of promoting and participating in the election for a next parent hierarchical level continues until the follower server either becomes the root of the async tree 200 or loses an election in a particular hierarchical level. If the follower server wins an election for the root node of the async tree 200, the follower server becomes the root and the process 600 terminates.

Referring back to the determination block 620, if the follower server loses an election for a particular hierarchical level, at block 630, the async-tree deployment server 445 makes the follower server a representative for the hierarchical level of the async tree 200 the follower server last won, e.g., the async-tree deployment server 445 deploys the follower server in the hierarchical level it server last won. If the follower server did not win any election, the follower server may not be deployed in the async tree 200. In some embodiments, the follower server may not be deployed in the async tree 200 if each of the hierarchical levels has a specified number of representatives.

Figure 7:
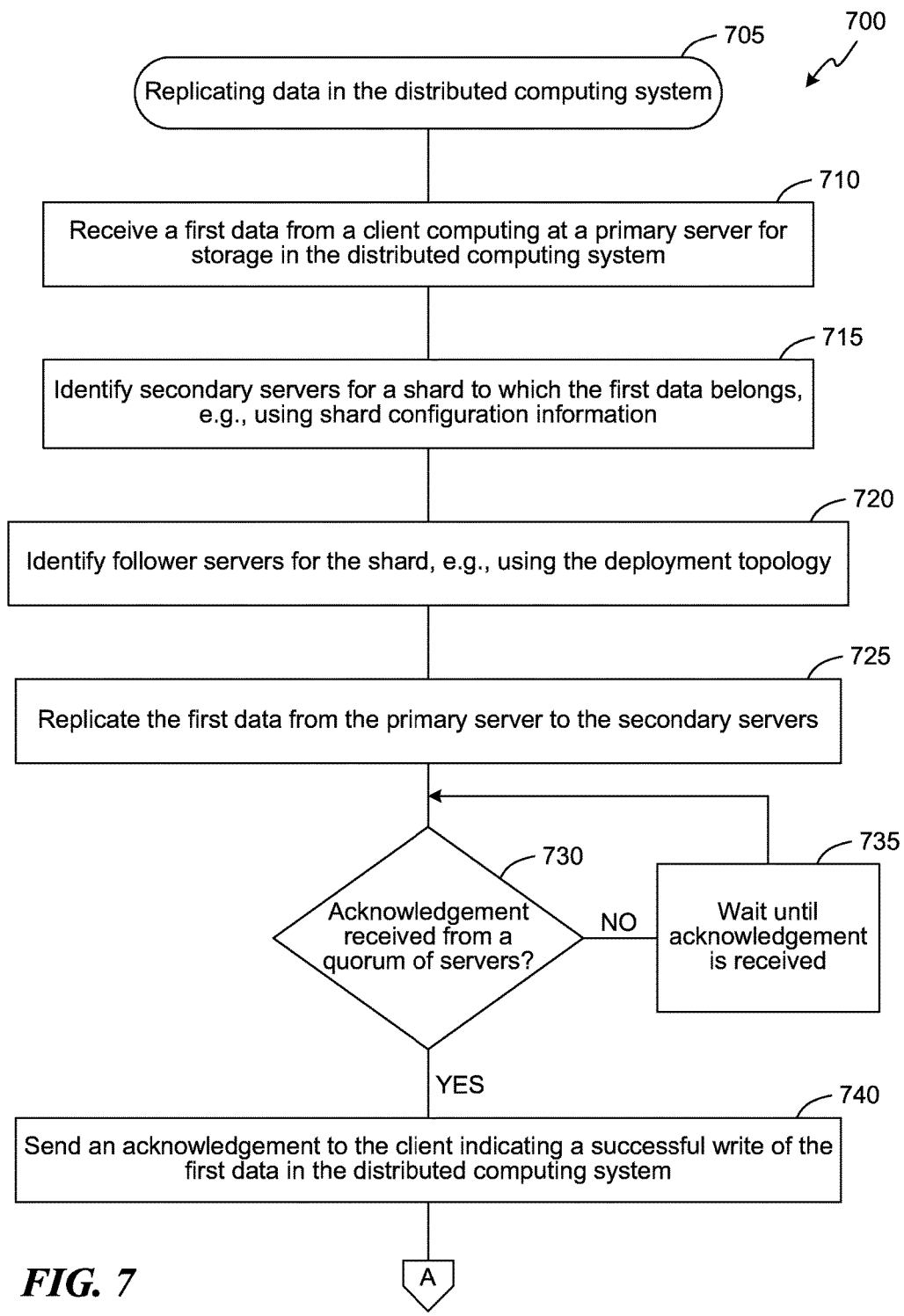
FIG. 7 is a flow diagram of a process of replicating data in the distributed computing system of FIG. 1, consistent with various embodiments.

FIG. 7 is a flow diagram of a process 700 of replicating data in the distributed computing system of FIG. 1, consistent with various embodiments. The process 700 may be executed in the environment 100 of FIG. 1 and using the system 400. The process 700 begins at block 705, and at block 710, the request handler component 415 receives a first data, e.g., first data 155, from a client, e.g., client 125, for storage in the distributed computing system 150. In some embodiments, the client 125 obtains the primary server, e.g., the primary server 115, for a shard associated with the first data 155 by querying the directory service 435.

At block 715, the data shuttle component 410 identifies secondary servers for the shard, e.g., using the configuration information provided by the shard management server 440. For example, the secondary servers can be secondary server 120a and secondary server 120b. The secondary servers and the primary server identified at block 710 form a sync replica set for the shard.

At block 720, the data shuttle component 410 identifies the follower servers for the shard, e.g., using the deployment topology and/or the configuration information. In some embodiments, the deployment topology can be included in the configuration information provided by the shard management server 440. For example, the follower servers can be the follower servers deployed as the set of async trees 110.

At block 725, the data shuttle component 410 synchronously replicates the first data 155 to the secondary servers in the sync replica set for the shard. The data shuttle components of the secondary servers 120 receive the data from the data shuttle component 410 and then store the first data 155 at the storage system associated with the corresponding secondary servers 120.

At determination block 730, the data shuttle component 410 determines if an acknowledgement is received from the quorum of servers in the sync replica set. If the acknowledgement is not yet received, at block 735, the request handler component 415 waits until the acknowledgement is received. If the acknowledgement is received, at block 740, the request handler component 415 sends an acknowledgement to the client 125 indicating that the first data 155 is successfully stored in the distributed computing system 150.

At block 745, the data shuttle component of one or more the secondary servers, e.g., secondary server 120a, asynchronously replicates the first data 155 to one or more of the follower servers in the set of async trees 110. For example, the data shuttle component of the secondary servers 120 asynchronously replicates the first data 155 to a root node of the async tree 130.

At block 750, the data shuttle components of the follower servers continue replicating the first data 155 from one hierarchical level to another hierarchical level until the follower servers at leaf level of the async tree 130 receive the first data 155, e.g., as described at least with reference to FIG. 2, and the process 700 returns. For example, the data shuttle component of the root node in the async tree 130 asynchronously replicates the first data 155 to the representative follower servers in the second hierarchical level 135b, which then asynchronously replicates to the representative follower servers in the third hierarchical level 135c, which then asynchronously replicates to the representative follower servers in the fourth hierarchical level 135d. That is, the data is replicated from a parent representative follower server to the child representative follower servers.

Figure 8:
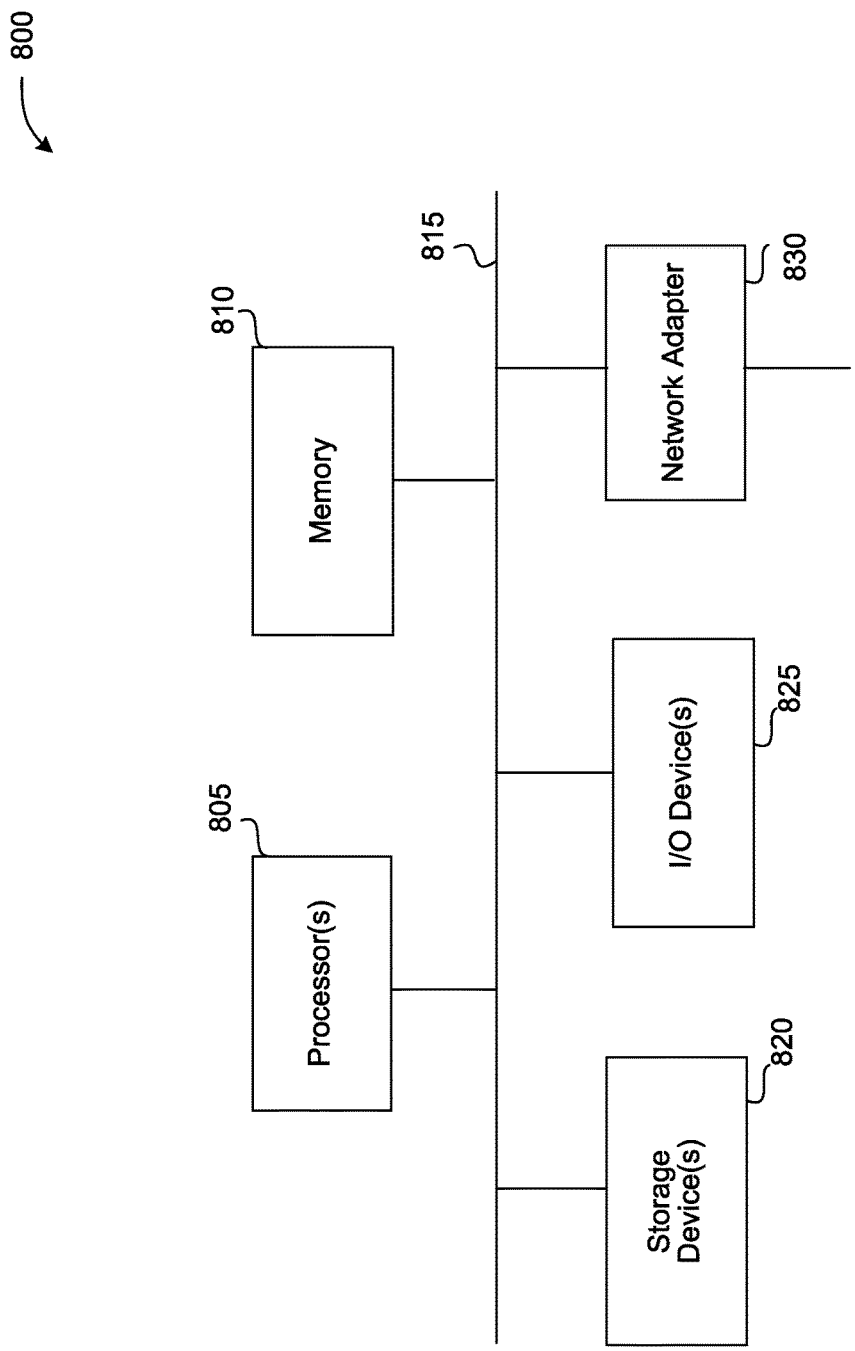
FIG. 8 is a block diagram of a processing system that can implement operations of the present invention.

FIG. 8 is a block diagram of a computer system as may be used to implement features of the disclosed embodiments. The computing system 800 may be used to implement any of the entities, components or services depicted in the examples of the foregoing figures (and any other components described in this specification). The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 810 and storage devices 820 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800 (e.g., via network adapter 830).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing system, comprising:
receiving, from a client computer, at one of multiple server computers in a distributed computing system, a write request for writing first data, the one of the server computers designated as a primary server computer for a shard to which the first data belongs;
identifying, by the primary server computer, a replica set of the server computers to which the first data is to be replicated, the replica set including at least some of the server computers designated as secondary server computers for the shard to which the first data belongs;
identifying at least some of the server computers designated as follower server computers for the shard to which the first data belongs, the follower server computers deployed in the distributed computing system based on a deployment topology to replicate the first data as a tree structure of multiple hierarchical levels, wherein the identifying includes:

causing a first follower server computer of the follower server computers to keep participating in an election for a position in a parent hierarchical level of a hierarchical level the first follower server computer last won the election until the first follower server computer loses the election or wins the election for being a root of the tree structure, and assigning the first follower server computer to the hierarchical level the first follower server computer last won the election; and replicating the first data from the primary server computer to the secondary server computers synchronously, from the secondary server computers to one of the follower server computers asynchronously.

2. The method of claim 1 further comprising:

receiving, at the primary server computer, an indication that the first data is stored at a quorum of server computers from the replica set, the quorum including the primary server computer and the secondary server computers; and sending, at the primary server computer, an acknowledgement for the write request to the client computer in response to receiving the indication.

3. The method of claim 1, wherein replicating the first data to the secondary server computers and the follower server computers includes:

replicating the first data to the secondary server computers synchronously from the primary server computer, and replicating the first data to at least some of the follower server computers asynchronously from one or more of the secondary server computers.

4. The method of claim 3, wherein replicating the first data to the at least some of the follower server computers includes:

replicating, by the one or more of the secondary server computers, the first data to a set of the one or more of the follower server computers in a first hierarchical level of the multiple hierarchical levels.

5. The method of claim 1, wherein identifying the replica set of the server computers includes receiving a shard assignment definition from a shard manager server computer, the shard assignment definition indicating the at least some of the server computers assigned as the secondary server computers for the shard.

6. The method of claim 1, wherein replicating the first data to the secondary server computers and the follower server computers includes:

replicating the first data from one of the secondary server computers to a first follower server computer of the follower server computers that is the root of the tree structure, replicating data from the first follower server computer to at least a group of the follower server computers that are children of the first follower server computer, the group of the follower server computers being in a second hierarchical level of the multiple hierarchical levels, and replicating the first data from one or more of the group of the follower server computers to distinct follower server computers that are children of the one or more of the group of the follower server computers and that are in a third hierarchical level of the hierarchical levels.

7. The method of claim 6 further comprising:

replicating the first data from the follower server computers in the third hierarchical level to the follower server computers in remaining ones of the hierarchical levels progressively until the follower server computers in a leaf hierarchical level of the tree structure receive the first data.

8. The method of claim 1, wherein identifying the at least some of the server computers designated as the follower server computers includes defining the deployment topology of the follower server computers, the defining including specifying a number of the follower server computers to be deployed in at least some of the multiple hierarchical levels.

9. The method of claim 1, wherein identifying the at least some of the server computers as the follower server computers includes:

determining whether the first follower server computer won a first election for a position in a specified hierarchical level of the multiple hierarchical levels, and assigning the first follower server computer to the specified hierarchical level if the first follower server computer wins the first election.

10. The method of claim 9, wherein assigning the first follower server computer to the specified hierarchical level includes:

determining whether the first follower server computer won a second election for a position in a parent hierarchical level of the specified hierarchical level, responsive to a determination that the first follower server computer won the second election, assigning the first follower server computer to the parent hierarchical level of the specified hierarchical level, and responsive to a determination that the first follower server computer did not win the second election, assigning the first follower server computer to the specified hierarchical level.

11. The method of claim 1, wherein the distributed computing system hosts a set of data, the set of data split into multiple shards, at least some of the shards including distinct subsets of the set of data, the shard being one of the shards.

12. The method of claim 11, wherein identifying the at least some of the server computers as the follower server computers includes:

assigning a first set of the server computers as a first set of follower server computers for a first shard of the shards, the follower server computers of the shard being different from the first set of follower server computers.

13. The method of claim 1, wherein the first data is replicated by a first application of multiple applications executing in the distributed computing system, and wherein identifying the replica set of server computers to which the first data is to be replicated includes:

defining a specified deployment topology of a first set of follower server computers for a specified application of the applications, the specified deployment topology being different from the deployment topology.

14. A non-transitory computer-readable storage medium storing computer-readable instructions, the instructions comprising:

instructions for receiving a replication policy for replicating a shard of multiple shards in a distributed computing system, the distributed computing system having multiple server computers;

instructions for determining, based on the replication policy, a replica set for the shard, the replica set including one of the server computers designated as a primary server computer for the shard, at least some of the server computers designated as secondary server computers for the shard;

instructions for deploying some of the server computers as follower server computers for replicating the shard from the replica set, the follower server computers deployed in a tree structure of multiple hierarchical levels and based on a deployment topology, the deployment topology being specific for a shard of multiple shards, wherein the deploying includes:
  causing a first follower server computer of the follower server computers to keep participating in an election for a position in a parent hierarchical level of a hierarchical level the first follower server computer last won the election until the first follower server computer loses the election or wins the election for being a root of the tree structure, and
  assigning the first follower server computer to the hierarchical level the first follower server computer last won the election; and
instructions for replicating the shard from the primary server computer to the secondary server computers synchronously, and from one or more of the secondary server computers to one of the follower server computers asynchronously.

15. The non-transitory computer-readable storage medium of claim 14, wherein the instructions for determining the replica set further include:
  instructions for publishing a list of primary server computers that are assigned to each of the shards by a directory service.

16. The non-transitory computer-readable storage medium of claim 15 further comprising:
  instructions for receiving from a client component executing at a client computer a request for an address of a first primary server computer that is assigned to a first shard of the shards; and
  instructions for obtaining the address of the first primary server computer from the directory service, and returning the address to the client computer for sending a read and/or write request for data associated with the first shard.

17. The non-transitory computer-readable storage medium of claim 14, wherein the instructions for replicating the shard from the one or more of the secondary server computers to the one or more of the follower server computers further include:
  instructions for replicating the shard from one of the secondary server computers to one of the follower server computers in a first hierarchical level of the multiple hierarchical levels, and
  instructions for replicating the shard from the first one of the follower server computers to one or more of the follower server computers in a next hierarchical level of the hierarchical levels of the tree structure.

18. The non-transitory computer-readable storage medium of claim 14, wherein the instructions for deploying the follower server computers based on the deployment topology include:
  instructions for deploying the first follower server computer in a specified hierarchical level of the multiple hierarchical levels of based on a result of a first election for a position in the specified hierarchical level.

19. The non-transitory computer-readable storage medium of claim 18, further comprising:
  instructions for causing the first follower server computer to participate in a second election for a position in a parent hierarchical level of the specified hierarchical level in an event the first follower server computer won the first election,
  responsive to a determination that the first follower server computer won the second election, assigning the first follower server computer to the parent hierarchical level, and
  responsive to a determination that the first follower server computer did not win the second election, assigning the first follower server computer to the specified hierarchical level.

20. A system, comprising:
  a processor;
  a shard management server configured to determine, in a distributed computing system having multiple server computers, a replica set of the server computers at which a shard of multiple shards is to be stored, the replica set including one of the server computers designated as a primary server computer and some of the server computers designated as secondary server computers for the shard;
  an async-tree deployment server configured to deploy at least some of the server computers designated as follower server computers for the shard in the distributed computing system, the follower server computers deployed in a tree structure of multiple hierarchical levels, wherein the async-tree deployment server is configured to:
    cause a first follower server computer of the follower server computers to keep participating in an election for a position in a parent hierarchical level of a hierarchical level the first follower server computer last won the election until the first follower server computer loses the election or wins the election for being a root of the tree structure, and
    assign the first follower server computer to the hierarchical level the first follower server computer last won the election; and
  a data shuttle component to replicate the shard from the primary server computer to the secondary server computers synchronously, and from the secondary server computers to one of the follower server computers asynchronously.

* * * * *

UNITED STATES PATENT AND TRADEMARK OFFICE
CERTIFICATE OF CORRECTION

PATENT NO. : 10,027,748 B2
APPLICATION NO. : 14/796810
DATED : July 17, 2018
INVENTOR(S) : Annamalai et al.

Page 1 of 1

It is certified that error appears in the above-identified patent and that said Letters Patent is hereby corrected as shown below:

In Column 21, Line 49, in Claim 17, delete "first one" and insert -- one --, therefor.

In Column 22, Line 3, in Claim 18, delete "levels of based" and insert -- levels based --, therefor.

Signed and Sealed this
Second Day of October, 2018

Andrei Iancu
*Director of the United States Patent and Trademark Office*